(12) United States Patent
Mayer et al.

(10) Patent No.: US 11,559,853 B2
(45) Date of Patent: Jan. 24, 2023

(54) METHOD FOR SCANNING THE SURFACE OF METAL WORKPIECES AND METHOD FOR CARRYING OUT A WELDING PROCESS

(71) Applicant: Fronius International GmbH, Pettenbach (AT)

(72) Inventors: Manuel Mayer, Pettenbach (AT); Andreas Waldhoer, Pettenbach (AT); Manuel Binder, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 0 days.

(21) Appl. No.: 17/601,305

(22) PCT Filed: Nov. 17, 2020

(86) PCT No.: PCT/EP2020/082318
§ 371 (c)(1),
(2) Date: Oct. 4, 2021

(87) PCT Pub. No.: WO2021/099286
PCT Pub. Date: May 27, 2021

(65) Prior Publication Data
US 2022/0161359 A1 May 26, 2022

(30) Foreign Application Priority Data
Nov. 18, 2019 (EP) ..................... 19209707

(51) Int. Cl.
*B23K 26/082* (2014.01)
(52) U.S. Cl.
CPC .................. *B23K 26/082* (2015.10)
(58) Field of Classification Search
CPC .... B23K 26/082; B23K 9/126; B23K 9/1278; B23K 9/173
(Continued)

(56) References Cited

U.S. PATENT DOCUMENTS 6,335,511 B1   1/2002  Rothermel
3,035,059 A1  10/2011  Artelsmair
(Continued)

FOREIGN PATENT DOCUMENTS

CN       1856381 A    11/2006
CN     101616768 A    12/2009
(Continued)

OTHER PUBLICATIONS

International Search Report in PCT/EP2020/082318, dated Mar. 29, 2021.
(Continued)

*Primary Examiner* — Dana Ross
*Assistant Examiner* — Joseph W Iskra
(74) *Attorney, Agent, or Firm* — Collard & Roe, P.C.

(57) ABSTRACT

Method for scanning the surface (O) of metallic workpieces (W), wherein, during a scanning process before a welding process is carried out, a welding torch (1) with a meltable welding wire (2) is moved over the surface (O) of the workpieces (W), and at predefined times ($t_i$) the welding wire (2) is moved towards the surface (O) of the workpieces (W) until a contact of the welding wire (2) with one of the workpieces (W) is detected, and the position ($P_i$) of the surface (O) of the workpieces (W) at each time ($t_i$) is determined and stored in the welding power source (4), wherein an edge (K) is determined if the current position ($P_i$) of the surface (O) of the workpieces (W) exceeds at least one of the stored previous positions ($P_{i-n}$) of the surface (O) of the workpieces (W) by a predefined threshold value (S). To reduce the computing effort and to increase processing speed, the end of the edge (K) is determined if the current position ($P_i$) of the surface (O) of the workpieces (W) remains the same with respect to at least one of the stored previous positions ($P_{i-n}$), and if an edge (K) is determined,
(Continued)

Figure 1:
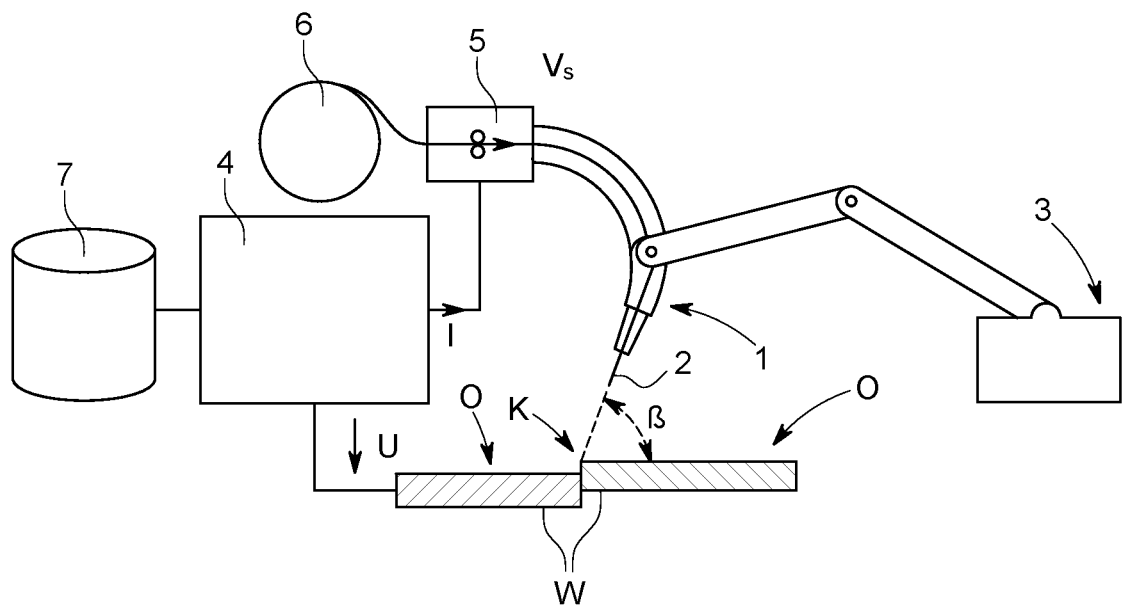

an edge detection parameter (KP) is set and output together with the current position value ($P_i$) and transferred to the manipulator (3).

20 Claims, 4 Drawing Sheets

(58) Field of Classification Search
USPC .................................................. 219/121.78
See application file for complete search history.

(56) References Cited

U.S. PATENT DOCUMENTS

| | | |
|---|---|---|
| 8,389,897 B2 | 3/2013 | Sardy et al. |
| 10,661,371 B2 | 5/2020 | Waldhoer et al. |
| 10,821,537 B2 | 11/2020 | Ennsbrunner et al. |
| 2009/0107961 A1 | 4/2009 | Zaffino et al. |
| 2013/0126491 A1 | 5/2013 | Veit et al. |
| 2020/0139474 A1 | 5/2020 | Mayer et al. |

FOREIGN PATENT DOCUMENTS

| | | |
|---|---|---|
| CN | 109475958 A | 3/2019 |
| CN | 109641298 A | 4/2019 |
| DE | 10 2010 018 032 A1 | 10/2011 |
| DE | 10 2014 208 371 A1 | 11/2015 |
| DE | 10 2014 217 890 A1 | 3/2016 |
| EP | 1192020 A1 | 4/2002 |
| JP | S55-64970 A | 5/1980 |
| JP | H07-308780 A | 11/1995 |
| JP | H07308780 * | 11/1995 |
| JP | 2013-056353 A | 3/2013 |
| JP | 2013056353 * | 3/2013 |
| WO | 2019/002141 A1 | 1/2019 |
| WO | WO2019002141 * | 1/2019 |

OTHER PUBLICATIONS

European Search Report in EP 19209707.9-1016, dated Jun. 9, 2020, with English translation of relevant parts.
Indian Examination Report in Indian Application No. 202117046651 dated Jul. 21, 2022.
Chinese Office Action in Chinese Application No. 202080028231.7 dated Sep. 26, 2022.

* cited by examiner

METHOD FOR SCANNING THE SURFACE OF METAL WORKPIECES AND METHOD FOR CARRYING OUT A WELDING PROCESS

CROSS REFERENCE TO RELATED APPLICATIONS

This application is the National Stage of PCT/EP2020/082318 filed on Nov. 17, 2020, which claims priority under 35 U.S.C. § 119 of European Application No. 19209707.9 filed on Nov. 18, 2019, the disclosure of which is incorporated by reference. The international application under PCT article 21(2) was not published in English.

The invention relates to a method for scanning the surface of metallic workpieces, wherein, during a scanning process before a welding process is carried out, a welding torch with a meltable welding wire is moved over the surface of the workpieces using a manipulator along a predefined path and at a specified speed, and at predefined times the welding wire is moved towards the surface of the workpieces at a first forward speed until a contact of the welding wire with one of the workpieces is detected by a welding power source, and the welding wire is then moved away from the workpieces again at a first reverse speed, and the position of the surface of the workpieces at each time is determined and stored in the welding power source, wherein an edge is determined if the current position of the surface of the workpieces exceeds at least one of the stored previous positions of the surface of the workpieces by a predefined threshold value.

Furthermore, the invention relates to a method for carrying out a welding process on workpieces using a welding torch with a meltable welding wire.

The welding wire of a welding device can be used before a welding process to scan the surface of the workpieces to be processed, by using the welding wire as a sensor, by moving it towards the workpiece at specified times until the welding wire contacts the workpiece. The welding wire is then moved away from the workpiece again. The movements of the welding wire, which are detected by rotary encoders in the drive rollers of the conveying device, can be used to trace back the position of the welding wire when it comes into contact with the workpiece, and thus determine the position of the surface of the workpiece.

For example, WO 2019/002141 A1 describes a method and an apparatus for scanning a surface of a metallic workpiece using the welding wire of the welding torch. In this solution, during the scanning process, upon each short-circuit of the welding wire with the metallic workpiece a position value is determined and stored or output, which can be used by the manipulator to detect an edge or a specific position. The algorithms required to achieve this would have to be implemented by all manufacturers of manipulators in their controller, which means a very large amount of software effort. Existing robot controllers and interfaces usually take too long for such an analysis, which is why only very low speeds of the welding torch can be selected during the scanning process to obtain sufficient accuracy.

Document JP 2013 56353 A disclosed a method for detecting the position of an edge of an overlapping seam of two overlapping workpieces. Here, the surface of the upper workpiece is scanned with the welding wire and the presence of an edge is determined if the vertical distance from one contact point to the next is greater than or equal to a specified threshold value. The scanning process is then stopped.

Document JP H07 308780 a describes a method for detecting the width of the gap between two workpieces, wherein the welding wire travels along the surface of a workpiece until the edge is detected as the start of the gap.

The object of the present invention consists in the creation of a scanning method and welding method mentioned above, which is intended to be able to be carried out as quickly as possible and does not require any special computing capacity for the evaluation in the manipulator. Disadvantages of known scanning methods are to be avoided or at least reduced.

The object according to the invention is achieved by a method identified above, wherein if the current position of the surface of the workpieces remains constant or essentially constant with respect to at least one of the stored previous positions, the end of the edge is detected, and upon an edge being determined an edge detection parameter is set and output together with the current position value and transferred to the manipulator. According to the invention, the edge and the end of the edge are detected during the scanning process and the data for the edge detection is processed in the power source and/or in the welding device, and instead of a large number of position data, only one edge detection parameter is set and output together with the current position value and forwarded to the manipulator. This means that the evaluation, which was previously carried out by the manipulator or welding robot, can be carried out more quickly and the scanning process can also be carried out more quickly as a result. Since the processing is carried out by the welding device or the power source during the scanning process, no corresponding computing capacity needs to be provided in the manipulator. According to the new method, only when the specified threshold value is exceeded in a direction that corresponds to the longitudinal direction of the welding wire is an edge detection parameter set which indicates the presence of the edge. In the event that the edge detection parameter is set, the current position value is stored or output. In contrast to the transmission of a series of position values to the manipulator, in the method according to the invention only the edge detection parameter together with the current position value needs to be transmitted to the manipulator. This makes the method much faster and simpler to carry out. The manipulator does not have to evaluate as much data as before, which means the manipulator can operate faster, or the computing power of the manipulator no longer needs to be as great, so that it can be implemented simply and more cheaply. The manipulator can be formed in particular by a robot, but also by other devices such as automatic welding devices, linear motion devices, or similar. The direct evaluation in a process controller of the welding device or the power source allows the scanning method to be filtered more flexibly in a process-synchronous manner, which also makes it possible to detect edges of workpieces on uneven, inclined, or curved surfaces. Because in the present evaluation method the manipulator only needs to query the edge detection parameter, which in the simplest case only contains one bit, the processing speed can be significantly increased without loss of accuracy.

Advantageously, an edge is determined if the current position of the surface of the workpieces exceeds the mean value of a plurality, preferably 2 to 100, of stored previous positions of the surface of the workpieces by a predefined threshold value. This represents a suitable method option, which due to the formation of mean values is not so susceptible to interference. Due to an appropriate averaging, in the case of a continuously slowly rising workpiece surface an edge is never detected, nor is an edge detection parameter set or output together with the current position value.

According to another feature of the invention, the difference in the position of the surface of the workpieces at the end of the determined edge and the last position stored before detection of the edge in a direction perpendicular to the surface of the workpieces, or in the direction of the longitudinal extension of the welding wire, is determined and output as a value for the edge height. Depending on the predefined times at which the surface of the workpieces is scanned with the welding wire, the method according to the invention allows a very precise measurement of the edge height and comparison with a setpoint. In addition to the edge detection parameter mentioned above, this value of the edge height can also be output with a corresponding accuracy (e.g. 16-bit value) and forwarded to the manipulator, for example, after the edge has been determined.

Furthermore, from the stored positions of the surface of the workpieces between the end of the determined edge and the stored position following the detection of the edge, the edge inclination can be determined and output. If the edge inclination is also determined during the scanning process, this can be taken into account in a subsequent welding process and, in the case of deviations of the actual edge inclination from the setpoint, an adjustment of the welding parameters can be made to achieve an optimal welding quality. Above a certain preset value of the edge inclination, the edge detection can also be deactivated, as there will no longer be an edge present.

Finally, from the stored positions of the surface of the workpieces between the end of the edge and the stored position following the detection of the edge, the radius of the edge can be determined and output. In addition to the above-mentioned edge parameters, the edge radius represents another parameter that can be detected during the scanning process, so that it can be taken into consideration during a welding process. In case of deviations of the edge radius from a desired value, the welding parameters can be adjusted accordingly during the welding process in order to avoid rejects and increase the economic efficiency of the welding method.

If the edge height, the edge inclination and/or the radius of the edge are transferred to the manipulator, at least one of these parameters can be taken into consideration in the manipulator. For example, the speed of the manipulator can be reduced if an edge height that differs from the setpoint is detected. Even with the transfer of all properties of the edge, the data transmission is significantly reduced compared to conventional methods, in which all position values were transferred to the manipulator, which means that the method can be carried out more quickly or less computing power is required in the manipulator. Complex processing of the raw position data in the manipulator is therefore no longer necessary.

For example, as a threshold value for determining an edge a distance or position value in a vertical direction relative to the surface of the workpieces or in the direction of the longitudinal extension of the welding wire can be specified, in the range between 0.1 mm and 20 mm. These values are particularly suitable for reliable detection of an edge during the scanning process. Below the limit of 0.1 mm, specifying a threshold value is not practical, as the accuracy limits of the devices would lead to misinterpretations and thus to erroneous detections of edges.

Corresponding to a scanning frequency of 20 Hz to 200 Hz, the welding wire can be moved towards the surface of the workpieces at time intervals of 5 ms to 50 ms, preferably 10 ms. This represents a reasonable compromise between the accuracy of the detection and the fastest possible execution.

The time intervals at which the surface of the workpieces is scanned by the welding wire can be adjusted accordingly to match the speed at which the welding torch is moved over the surface of the workpieces during the scanning process. Therefore, if the welding torch is moved over the surface of the workpieces at a lower speed during the scanning process, longer time intervals between the scanning points can be selected than if the welding torch is moved over the workpiece surface at a high speed. The lower limit for the time intervals between two scanning points is determined by the speed of the conveying device with which the welding wire is moved towards the workpiece and moved away from the workpiece again. For example, the time intervals and scanning parameters can also be adjusted to suit the material of the workpieces, to suit the material and diameter of the welding wire used, the geometry of the welding torch (tube bend curvature), etc.

The welding torch is preferably oriented at an angle of 60° to 90° to the surface of the workpieces, so that the welding wire can be moved towards the surface of the workpieces and away from the surface of the workpieces at such an angle of 60° to 90°. These values have been shown to be particularly suitable for the scanning method. Angles that are too shallow are not suitable for the scanning procedure since inaccuracies can occur due to lateral deflection of the welding wire or bending of the welding wire.

According to another feature of the invention, on detecting a longer short-circuit between the welding wire and the workpieces, the welding wire is moved away from the surface of the workpieces during the scanning process at a higher reverse speed than the first reverse speed. A longer-lasting short-circuit between the welding wire and the workpieces is an indication of the presence of an edge, since the short-circuit is maintained for longer despite a reverse movement of the welding wire. This measure takes into account changes in the surface of the workpieces and the scanning process is speeded up due to the higher reverse speed of the welding wire than the first reverse speed. In particular if the welding torch reaches an edge during the scanning process, the welding wire is brought to the higher position of the workpiece surface more quickly as a result of the edge. The duration of the short-circuit above which a higher reverse speed than the first reverse speed is applied can be ascertained and specified from corresponding empirical values.

The welding wire can also be moved towards the surface of the workpieces at a higher forward speed than the first forward speed after the welding wire is moved away from the surface of the workpieces at the higher reverse speed than the first reverse speed and no short-circuit is detected. This measure also contributes to a faster execution of the scanning process and the end of the detected edge can thus be more precisely represented.

To ensure a sufficiently accurate detection of an edge, the welding torch is moved over the surface of the workpieces perpendicular to an expected edge at at least three points. This represents a sufficiently accurate detection for straight edges particularly commonly found between two workpieces, since thus the starting point, end point and path of the edge are uniquely defined.

Advantageously, during a method for carrying out a welding process, welding parameters are automatically controlled depending on the edge determined during a scanning process described above and, if necessary, on the determined edge parameters such as edge height, edge inclination or edge radius. As already mentioned above, the determined real values of the edge parameters, such as edge height, edge inclination or edge radius, can be taken into account in the subsequent welding process and, in order to achieve a better welding quality or reduce the rejection rate, the welding parameters can be adapted to the determined real values. For example, the arc length, the stick-out length, the wire conveying speed or the torch speed can be adjusted accordingly, or under certain conditions a process change can even be carried out.

For example, during the welding process, the welding current and/or the welding voltage and/or the conveying speed of the welding wire can be controlled depending on the edge determined and, if necessary, on the determined edge parameters such as edge height, edge inclination, or edge radius.

Figure 2:
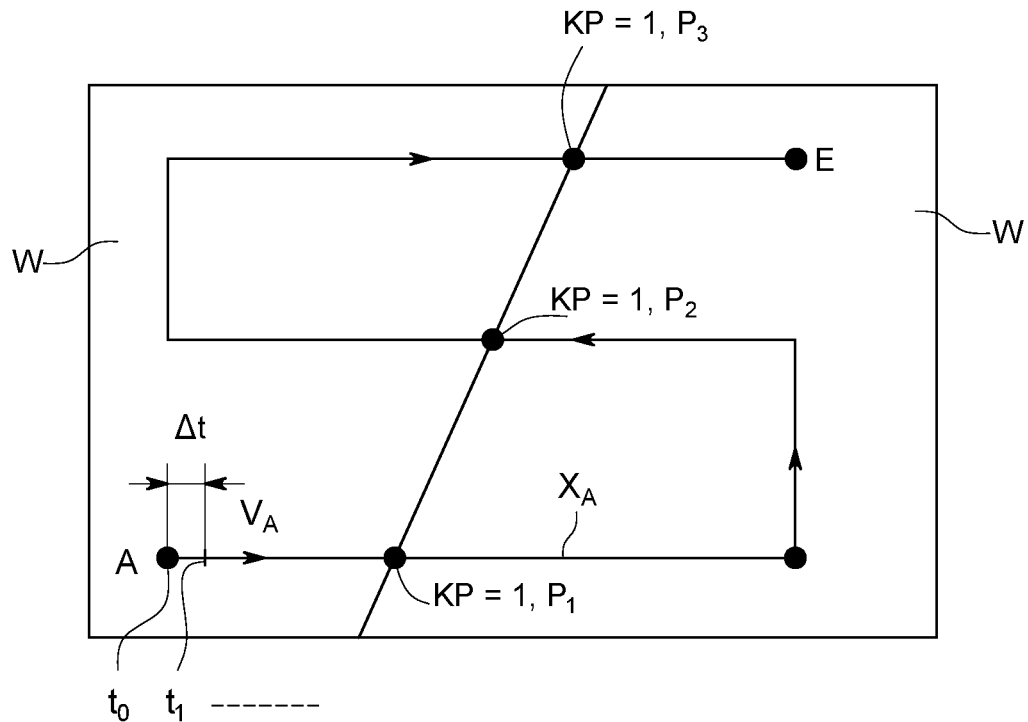
Figure 3:
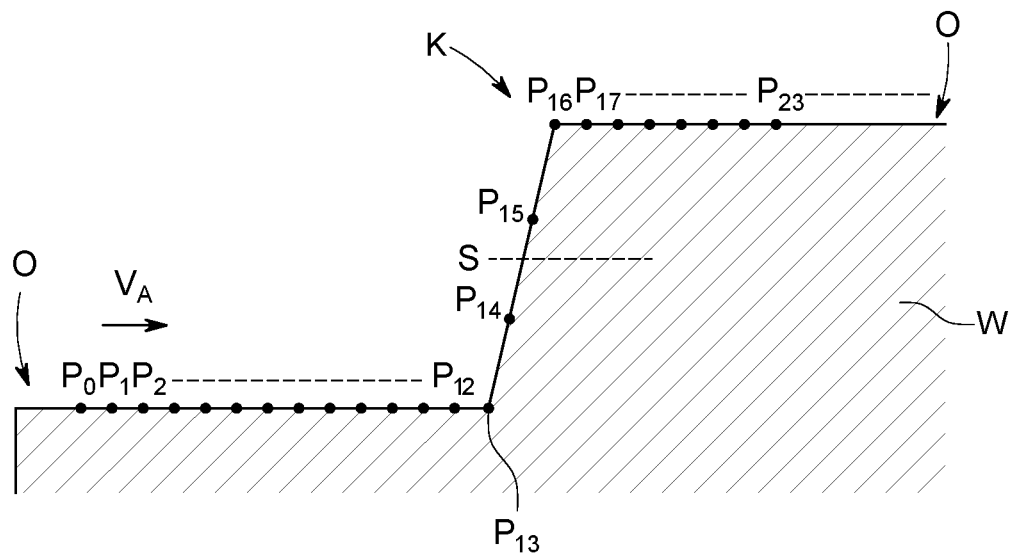
Figure 4:
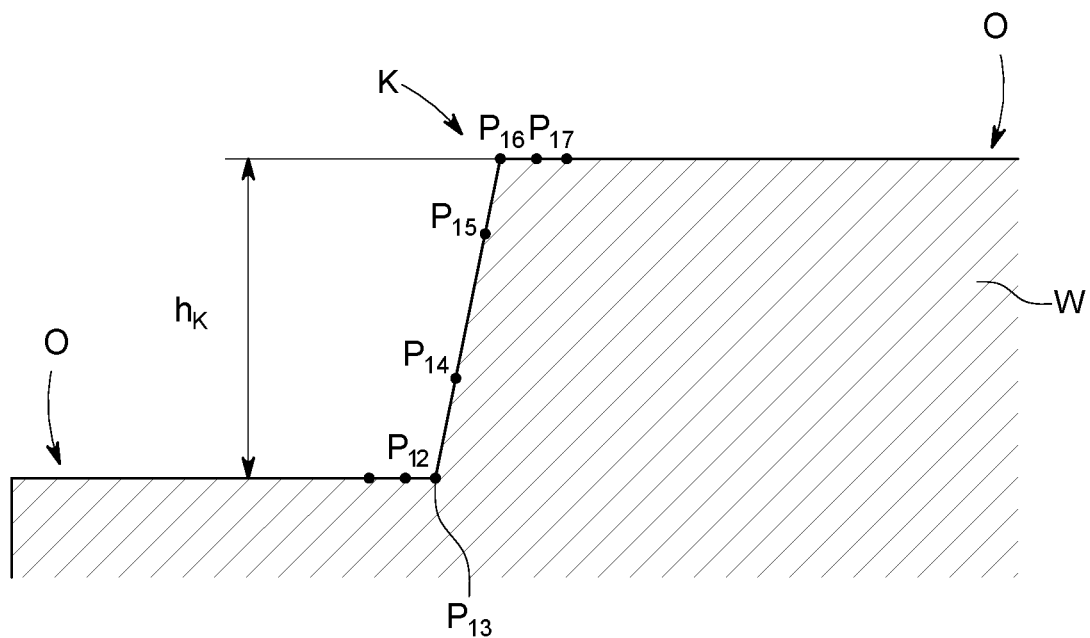
Figure 5:
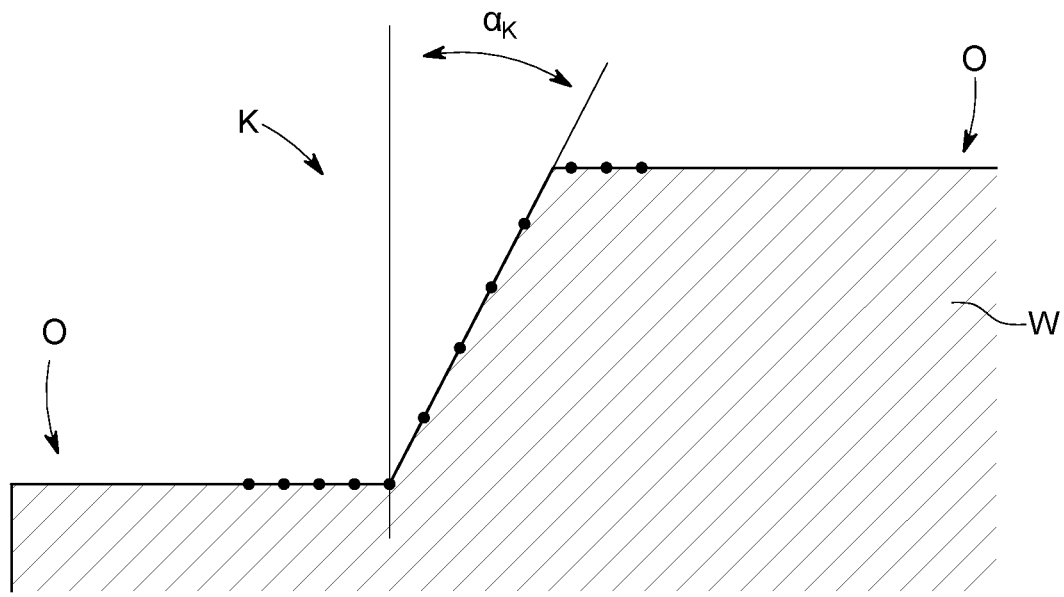
Figure 6:
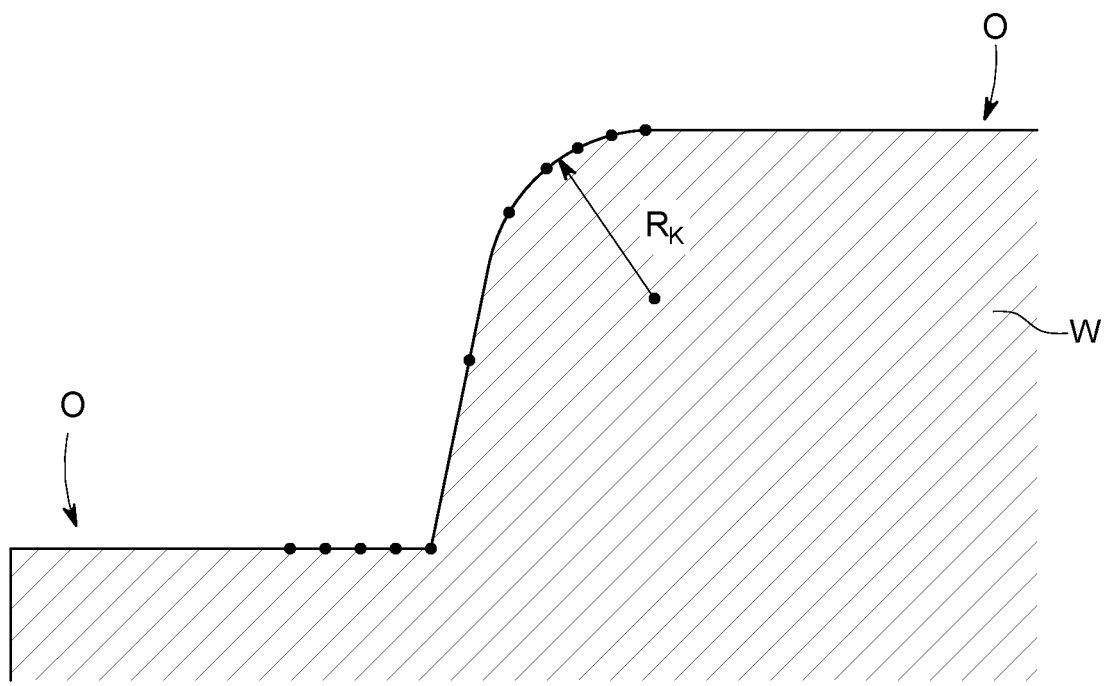
Figure 7:
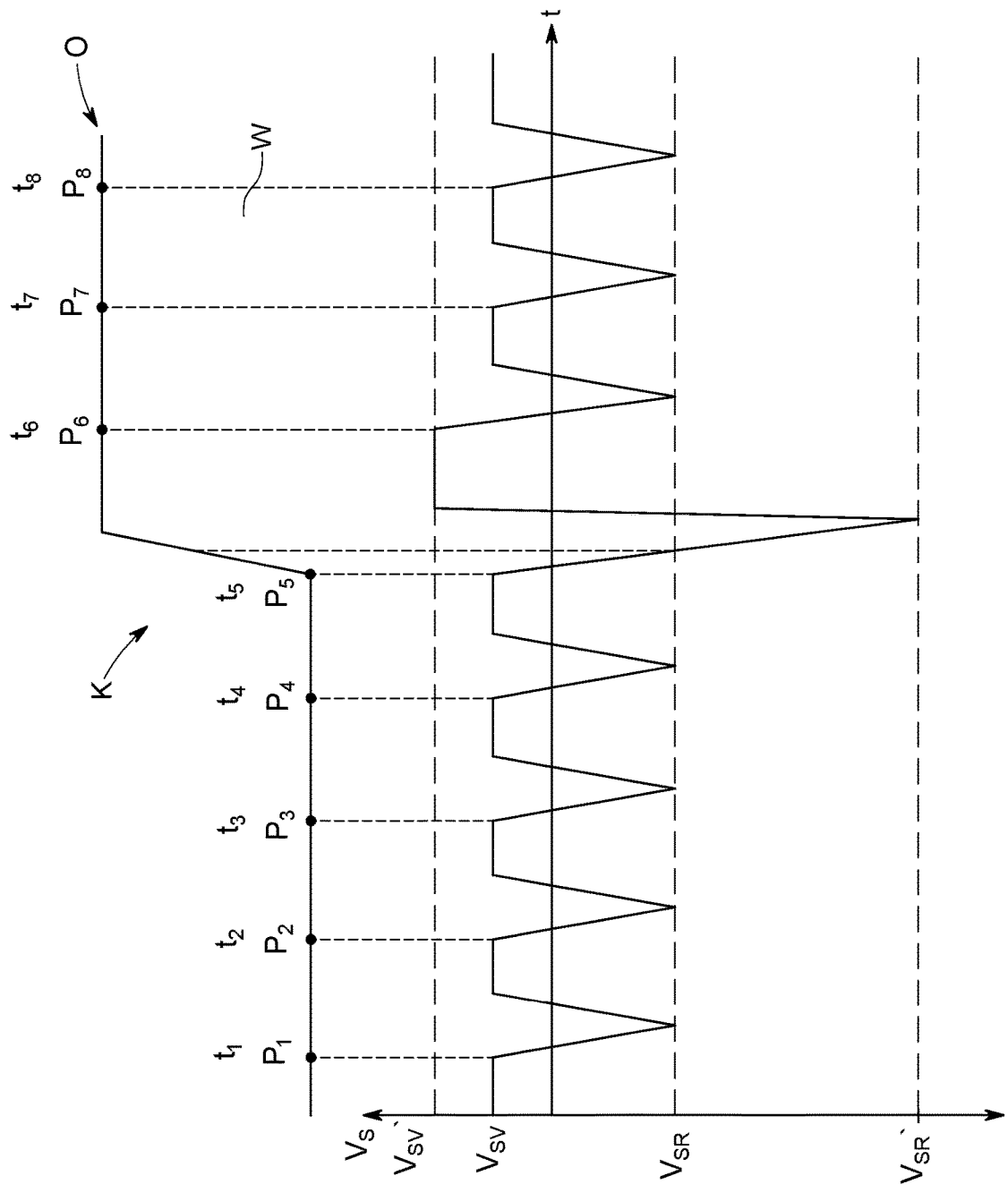

The present invention will be explained in further detail by reference to the attached drawings. Shown are:

FIG. 1 a schematic diagram of a welding device for carrying out a welding process and scanning process;

FIG. 2 a possible path of the welding torch along the surface of metal workpieces during a scanning process;

FIG. 3 a schematic diagram explaining the present method for scanning the surface of metal workpieces for the purpose of detecting an edge;

FIG. 4 a schematic diagram for explaining the determination of the height of an edge from the position values of the surface of the workpieces;

FIG. 5 a schematic diagram for explaining the determination of the edge inclination from the position values of the surface of the workpieces;

FIG. 6 a schematic diagram for explaining the determination of the edge radius from the position values of the surface of the workpieces; and FIG. 7 a variant of the scanning method according to the invention with different conveying speeds of the welding wire depending on the position values of the surface of the workpieces.

FIG. 1 shows a schematic diagram of a welding device for carrying out a welding process and scanning process. A welding torch 1 with a welding wire 2 is connected to a corresponding manipulator 3, for example a welding robot. A welding power source 4 supplies the welding torch 1 or the welding wire 2 with the welding current I and the welding voltage U. Via a conveying device 5, the welding wire 2 is conveyed from a wire roll 6 to the welding torch 1 with a conveying speed $v_S$. During the scanning process, the welding torch 1 with the welding wire 2 is moved using the manipulator 3 across the surface O of the workpieces W along a predefined path $x_A$ and with a predefined velocity $V_A$. At specified times $t_i$, the welding wire 2 is moved towards the surface O of the workpieces W at a first forward speed $v_{SV}$ until contact of the welding wire 2 with one of the workpieces W is detected by the welding power source 4. This detection is carried out by measuring the breakdown of the voltage upon the short-circuit between welding wire 2 and workpiece W. Thereafter, the welding wire 2 is moved away from the workpieces W again at a first reverse speed $v_{SR}$. The position $P_i$ of the surface O of the workpieces W at each of the times $t_i$ is determined and stored in the welding power source 4. In previous scanning methods, these position values $P_i$ were forwarded to the manipulator 3, which meant a high level of data exchange between the welding power source 4 and manipulator 3 and slowed down the scanning process. According to the invention, an edge K on the surface O of the workpieces W is determined if the current position $P_i$ of the surface O of the workpieces W is located above at least one of the stored previous positions $P_{i-n}$ of the surface O of the workpieces W by a predefined threshold value S. If the specified threshold value S is exceeded, an edge detection parameter KP is set, in the simplest case only one bit is set to "1" and output together with the current position value $P_i$. In contrast to previous methods, only the value of the edge detection parameter KP together with the current position value $P_i$ now has to be transferred to the manipulator 3, thereby considerably speeding up the method or increasing the accuracy. During the scanning process, the welding torch 1 is preferably oriented at an angle ß of 60° to 90° to the surface O of the workpieces W.

FIG. 2 shows a possible path of the welding torch 1 along the surface O of metallic workpieces W during a scanning process, looking onto the workpieces W. For a normally straight edge K, for example, a meandering path $x_A$ of the welding torch 1 over the workpieces W is suitable for a unique determination of the position of the edge K. Accordingly, the welding torch 1 is guided from a starting point A in a meandering path around the expected position of the edge K up to an end point E. The scanning method is carried out along the specified path $x_A$ at specified times $t_i$ by the welding wire 2 being moved towards the workpiece W until a physical contact (short-circuit) between welding wire 2 and workpiece W is detected by the power source 4. The welding wire 2 is then moved away from the workpiece W and the values determined via the drive of the conveying device 5 are defined as position $P_i$ of the surface O of the workpieces W. If an edge K is detected (see FIG. 3 of the Description), the edge detection parameter KP is set to 1, for example, and the respective position $P_i$ is stored. In the exemplary embodiment illustrated, the position values P1, P2 and P3 are stored at the 3 points along the edge K where the edge parameter KP=1. Thus, it is no longer necessary to store all the position values $P_i$ that are determined at all times $t_i$ and to forward them to the manipulator 3, but only the edge detection parameter KP, which in the simplest case comprises only one bit, and the corresponding position value $P_i$. Thus, for the unique definition of the straight edge K, it can be sufficient to transfer three edge parameters KP together with position values $P_i$. The welding torch 1 can be aligned according to the position of the expected edge K, as a result of which it is possible to take into account whether the welding torch 1 is being moved over the edge K from top to bottom or the other way round, from bottom to top.

FIG. 3 shows a schematic diagram for explaining the present method for scanning the surface O of metallic workpieces W for the purpose of detecting an edge K. This illustration shows the scanning method according to the invention, in which the positions $P_i$ of the surface O of workpieces W at specified times $t_i$ are detected using the welding wire 2. If the current position $P_i$ of the surface O of the workpieces W is located above at least one of the stored previous positions $P_{i-n}$ of the surface O of the workpieces W by a predefined threshold value S, an edge detection parameter KP is set and output together with the current position value $P_i$ and the presence of an edge K is indicated. In the present case, this is the case at position $P_{15}$, where the threshold value S has been exceeded. For smoothing, mean values of a plurality, preferably 2 to 100, of stored previous positions $P_{i-n}$ can be used as a comparison value for the current position $P_i$. By means of an appropriate averaging, in the case of a slowly and continuously rising surface O, an edge K will never be detected nor will the edge detection parameter KP be set. As with the start of the edge K, the end of the edge K can also be determined via the positions $P_i$ if it is detected that the current position $P_i$ of the surface O of the workpieces W remains essentially constant with respect to at least one of the stored previous positions $P_{i-n}$. At position $P_{17}$ according to FIG. 3, the position is essentially the same as the previous value $P_{16}$, so that the end of the edge K can be defined.

FIG. 4 shows a schematic diagram for explaining the determination of the height $h_K$ of an edge K from the position values $P_i$ of the surface O of the workpieces W. From the difference of the positions $P_i$, surface O of workpieces W at the end of the determined edge K and the last stored position before detection of the edge K, the edge height $h_K$ can be determined. In the present example, the height of the edge $h_K$ would be determined as the difference between position $P_{16}$ and $P_{13}$.

FIG. 5 shows a schematic diagram for explaining the determination of the edge inclination $\alpha_K$ from the position values $P_i$ of the surface O of the workpieces W. The edge inclination $\alpha_K$ can be reliably determined from the determined position values $P_i$ and the detection of the start and end of the edge K.

FIG. 6 shows a schematic diagram for explaining the determination of the edge radius $R_K$ from the position values $P_i$ of the surface O of the workpieces W. From the position values $P_i$ determined from the beginning of the detection of the edge K to the end of the detection of the edge K, the radius $R_K$ of the edge K can be deduced and a corresponding value determined. Deviations of the edge radius $R_K$ from the setpoint can be compensated during a welding process by adjusting the welding parameters, in particular the welding current I, the welding voltage U, or the conveying speed $v_S$ of the welding wire 2.

During the welding process to be carried out, the welding parameters, such as the arc length, the stick-out length, the wire conveying speed or the torch speed, can be adapted to the edge parameters (edge height, edge inclination, edge radius) previously determined during the edge detection process. If a welding process cannot be performed due to the actual edge conditions, for example, because the diameter of the welding wire is too small, an error message can be issued.

Finally, FIG. 7 shows a variant of the scanning method according to the invention with different conveying speeds $V_S$ of the welding wire 2 depending on the position values $P_i$ of the surface O of the workpieces W. In the upper part of FIG. 7, an edge K between two workpieces W is again shown in cross-section, and the times $t_i$ at which the position $P_i$ of the surface O of the workpieces W is detected, starting with position $P_i$ at time $t_i$ up to position $P_8$ at time $t_8$. During the scanning process, the welding wire 2 is moved towards the workpiece W at the times $t_i$ with a predefined first forward velocity $v_{SV}$ until a short-circuit is detected, and then moved away from the workpiece W with a predefined first reverse velocity $v_{SR}$. This is shown for the first five points $P_1$ to $P_5$. If a longer short-circuit is detected due to the edge K, which is the case at position $P_5$ at time $t_5$, the welding wire 2 can be moved away from the surface O of the workpieces W at a higher reverse speed $v_{SR}'$ than the first reverse speed $v_{SR}$. This allows the scanning process to be performed even faster and more accurately. After the scanning step with the higher reverse speed $V_{SR'}$, the forward speed $v_{SV}$ is increased to a higher forward speed $v_{SV'}$ than the first forward speed $v_{SV}$, provided that no further short-circuit is detected. This is the case in the exemplary embodiment illustrated before position $P_6$ at time $t_6$.

The invention claimed is:

1. A method for scanning the surface of metallic workpieces, wherein, during a scanning process before a welding process is carried out, a welding torch with a meltable welding wire is moved over the surface of the workpieces using a manipulator along a predefined path and at a specified speed, and at predefined times the welding wire is moved towards the surface of the workpieces at a first forward speed until a contact of the welding wire with one of the workpieces is detected by a welding power source, and the welding wire is then moved away from the workpieces again at a first reverse speed, and the position of the surface of the workpieces at each time is determined and stored in the welding power source, wherein an edge is determined if the current position of the surface of the workpieces exceeds at least one of the stored previous positions of the surface of the workpieces by a predefined threshold value, wherein the end of the edge is determined if the current position of the surface of the workpieces remains the same with respect to at least one of the stored previous positions, and that if an edge is determined, an edge detection parameter is set and output together with the current position value and transferred to the manipulator.

2. The method according to claim 1, wherein an edge is determined if the current position of the surface of the workpieces exceeds the mean value of a plurality of stored previous positions of the surface of the workpieces by a predefined threshold value.

3. The method according to claim 1, wherein the difference between the position of the surface of the workpieces at the end of the determined edge and the last stored position before the detection of the edge in a direction perpendicular to the surface of the workpieces, or in the direction of the longitudinal extension of the welding wire, is determined as the value of an edge height and output.

4. The method according to claim 1, wherein from the stored positions of the surface of the workpieces between the end of the determined edge and the stored position following the detection of the edge, an edge inclination is determined and output.

5. The method according to claim 1, wherein from the stored positions of the surface of the workpieces between the end of the determined edge and the stored position following the detection of the edge, a radius of the edge is determined and output.

6. The method according to claim 3, wherein the edge height, an edge inclination and/or a radius of the edge are transferred to the manipulator.

7. The method according to claim 1, wherein the welding wire is moved towards the surface of the workpieces at time intervals of 5 ms to 50 ms.

8. The method according to claim 7, wherein the time intervals are adjusted to match the speed at which the welding torch is moved over the surface of the workpieces during the scanning process.

9. The method according to claim 1, wherein the welding torch is oriented at an angle of 60° to 90° to the surface of the workpieces, so that the welding wire is moved towards the surface of the workpieces and away from the surface of the workpieces at such an angle of 60° to 90°.

10. The method according to claim 1, wherein on detecting a longer short-circuit between the welding wire and the workpieces, the welding wire is moved away from the surface of the workpieces at a higher reverse speed than the first reverse speed.

11. The method according to claim 10, wherein the welding wire is moved towards the surface of the workpieces at a higher forward speed than the first forward speed after the welding wire is moved away from the surface of the workpieces at the higher reverse speed than the first reverse speed and no short-circuit is detected.

12. The method according to claim 1, wherein the welding torch is moved over the surface of the workpieces perpendicular to an expected edge at at least three points.

13. The method for carrying out a welding process using a welding torch with a meltable welding wire on workpieces, wherein during the welding process, welding parameters are automatically controlled depending on the edge determined during the method according to claim 1.

14. The method according to claim 13, wherein during the welding process, the welding current and/or the welding voltage and/or the conveying speed of the welding wire are controlled depending on the edge determined during the scanning process.

15. The method according to claim 2, wherein the edge is determined if the current position of the surface of the workpieces exceeds the mean value of 2 to 100 stored previous positions of the surface of the workpieces by the predefined threshold value.

16. The method according to claim 7, wherein the welding wire is moved towards the surface of the workpieces at time intervals of 10 ms.

17. The method for carrying out a welding process according to claim 13, wherein during the welding process, welding parameters are automatically controlled depending on a determined edge parameter.

18. The method for carrying out a welding process according to claim 17, wherein the determined edge parameter comprises at least one of an edge height, an edge inclination or an edge radius.

19. The method according to claim 14, wherein during the welding process, the welding current and/or the welding voltage and/or the conveying speed of the welding wire are controlled depending on a determined edge parameter.

20. The method for carrying out a welding process according to claim 19, wherein the determined edge parameter comprises at least one of an edge height, an edge inclination or an edge radius.

* * * * *